United States Patent
Grandison et al.

(10) Patent No.: US 8,359,531 B2
(45) Date of Patent: Jan. 22, 2013

(54) METHOD AND APPARATUS FOR HIGHLIGHTING DIVERSE ASPECTS IN A DOCUMENT

(75) Inventors: Tyrone Wilberforce Andre Grandison, San Jose, CA (US); Kun Liu, San Jose, CA (US); Evimaria Terzi, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 12/480,548

(22) Filed: Jun. 8, 2009

(65) Prior Publication Data
US 2009/0327878 A1    Dec. 31, 2009

Related U.S. Application Data

(60) Provisional application No. 61/076,562, filed on Jun. 27, 2008.

(51) Int. Cl.
G06F 17/00 (2006.01)

(52) U.S. Cl. ................... 715/254; 707/736; 707/738

(58) Field of Classification Search .......... 715/234, 715/243, 254, 255, 256; 707/736, 738; 704/1, 704/9
See application file for complete search history.

(56) References Cited

U.S. PATENT DOCUMENTS

| | | | |
|---|---|---|---|
| 5,689,716 A * | 11/1997 | Chen | 715/256 |
| 6,611,825 B1 | 8/2003 | Billheimer et al. | |
| 6,990,634 B2 | 1/2006 | Conroy et al. | |
| 7,017,114 B2 * | 3/2006 | Guo et al. | 715/247 |
| 7,185,001 B1 | 2/2007 | Burdick et al. | |
| 7,607,083 B2 * | 10/2009 | Gong et al. | 715/254 |
| 7,698,339 B2 * | 4/2010 | Zhang et al. | 707/755 |
| 7,783,640 B2 * | 8/2010 | Liao et al. | 707/736 |
| 2007/0118518 A1 | 5/2007 | Wu et al. | |
| 2008/0109399 A1 | 5/2008 | Liao et al. | |

OTHER PUBLICATIONS

Song, et al., "Learning Block Importance Models for Web Pages", *WWW 2004*, New York, NY, USA, 9 pages, May 17-22, 2004.
Amitay, et al., "Automatically Summarising Web Sites—Is There a Way Around It?", *Division of Information and Communication Sciences*, Macquarie University, NSW Australia, 7 pages, Nov. 11, 2000.
Goldstein, et al., "Summarizing Text Documents: Sentence Selection and Evaluation Metrics", *Language Technologies Institute*, Carnegie Mellon University, Pittsburgh, PA, 8 pages, Jul. 1, 1999.
Turpin, et al., "Fast Generation of Result Snippets in Web Search", *SIGIR '07*, Amsterdam, The Netherlands, pp. 127-134, Jul. 23-27, 2007.
Honarpisheh, et al., "A Multi-Document Multi-Lingual Automatic Summarization System", Sharif University of Technology, pp. 733-738, Jan. 12, 2008.
Steinberger, et al., "Web Topic Summarization", Proceedings ELPUB 2008 Conference on Electronic Publishing, Toronto Canada, pp. 322-334, Jun. 2008.

* cited by examiner

*Primary Examiner* — Adam M Queler
(74) *Attorney, Agent, or Firm* — Dianoosh Salehi

(57) ABSTRACT

The disclosure generally relates to document summarization. Given a document, summarization can be defined as picking k sentences from the original document D such that the constructed summary exhibits two key properties: coverage and orthogonality. In one embodiment of the disclosure, the two requirements are captured in a combinatorial formulation of the problem and presented as an algorithms.

1 Claim, 6 Drawing Sheets

---

1: Input: Document $\mathcal{D}$, integer $k$ and function $f$.
2: Output: A set of sentences $S \subseteq \mathcal{D}$ with $|S| \leq k$.
3: $C = \mathcal{D}, S = \emptyset, W = \bigcup_{s \in \mathcal{D}} s, \text{MaxImpr} = \infty, \ell = 0$
4: while $\ell \leq k$ and $\text{MaxImpr} > 0$ do
5:     pick $s \in C$ such that $s = \arg\max_{s' \in C} G_f(S \cup s') - G_f(S)$
6:     $\text{MaxImpr} = G_f(S \cup s) - G_f(S)$
7:     if $\text{MaxImpr} > 0$ then
8:         $C = C \setminus \{s\}$
9:         $\ell = \ell + 1$
10:        $S = S \cup \{s\}$
11:    end if
12: end while

1: Input: Document $\mathcal{D}$, integer $k$ and function $f$.
2: Output: A set of sentences $S \subseteq \mathcal{D}$ with $|S| \leq k$.
3: $C = \mathcal{D}, S = \emptyset, W = \bigcup_{s \in \mathcal{D}} s, \texttt{MaxImpr} = \infty, \ell = 0$
4: while $\ell \leq k$ and $\texttt{MaxImpr} > 0$ do
5:     pick $s \in C$ such that $s = \arg\max_{s' \in C} G_f(S \cup s') - G_f(S)$
6:     $\texttt{MaxImpr} = G_f(S \cup s) - G_f(S)$
7:     if $\texttt{MaxImpr} > 0$ then
8:         $C = C \setminus \{s\}$
9:         $\ell = \ell + 1$
10:        $S = S \cup \{s\}$
11:    end if
12: end while

FIG. 3

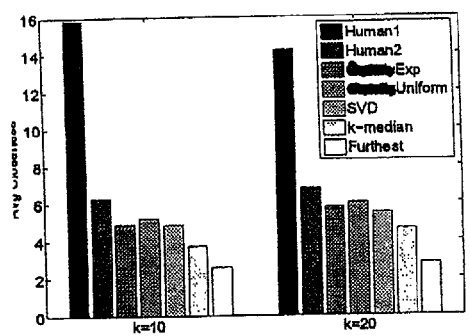 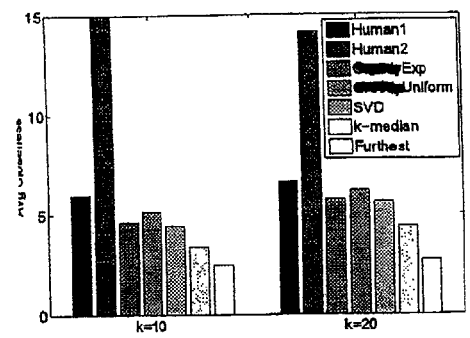
Fig. 5(A)
Average Closeness to
Human1 Summaries
Fig. 5(B)
Average Closeness to
Human2 Summaries

METHOD AND APPARATUS FOR HIGHLIGHTING DIVERSE ASPECTS IN A DOCUMENT

The Application claims priority to Provisional Application Number 61/076,562 filed Jun. 27, 2008, the specification of which is incorporated herein in entirety.

BACKGROUND

1. Field of the Invention

The disclosure generally relates to a method and apparatus for providing a document summary. More specifically, the disclose relates to method and apparatus for providing document summaries that cover a majority of the concepts discussed in the document while being within a length requirement provided by the user.

2. Description of Related Art

The problem of identifying the gist of a document is conventionally referred to as the text summarization or document summarization problem. Traditional document-summarization techniques focus on the central idea of the text. With the rapid explosion of content on the world wide web, particularly in online text collections, it has become useful to provide improved mechanisms for identifying the important information themes associated with a text document or a collection of documents.

Consider an automatic syndication feed (also known as the RSS or automatic feed) that contains users' comments about a specific movie. Summarization is necessary since there may be several hundred comments written on the movie. However, the challenge is that there usually does not exist a single central idea in these comments. Each one of these comments often has a different focus because every user looks at the movie from a different angle. Some users comment about the scenery, some about the actors or the director, others about the plot itself, etc. From the reader's perspective, going through all the reviews is a tedious and often annoying task. At the same time, it is useful, and often necessary, to get a quick idea of what other moviegoers think about the movie. This would require the generation of a summary that covers different aspects of the comments written by the different users.

This scenario brings out an important point that summarization has become significant in helping us deal with the information explosion currently underway. The significance of this phenomenon is amplified by the fact that the above-discussed case applies to many other domains and applications, e.g., when someone is reading online comments and discussions following blogs, videos and news articles.

In any text summarization, the problem becomes picking the right sentences from the original document so that these sentences can capture different viewpoints. This requirement is further refined by the following two criteria: (a) Coverage—The summary should consist of sentences that span a large portion of the spectrum of aspects discussed in the document; and (b) Orthogonality—Each sentence in the summary should capture different aspects of the document in the summary and should be as orthogonal to each other as possible.

The conventional summarization methods do not address coverage and orthogonality. Therefore, there is a need for a method and apparatus to provide a system and method for highlighting diverse aspects in a document.

SUMMARY

The disclosure relates to a document-summarization system that ingests a document and automatically highlights a small set of sentences that cover different aspects of the document. In one embodiment, the sentences are picked using the simple coverage and orthogonality criteria. One embodiment of the system can summarize plain text and automatic syndication feeds. However, we assume that this invention can also be used to summarize other equivalent inputs. The embodiments disclosed herein can run either as stand-alone applications or can be integrated with other text-oriented tools and mechanisms, such as Web 2.0 forums, to pinpoint different opinions on online discussions for blogs, products, movies, etc.

In one embodiment, the disclosure relates to a method for creating a summary of one or more electronic documents, the summary consisting of sentences that span a document and capture different aspects of the document, the method comprising: combining information extracted from one or more electronic documents into a single plain text electronic document or its equivalent; filtering the electronic document (1) to remove stop words and spam words, (2) to link semantically similar words and phrases, and (2) to construct a filtered electronic document having n sentences and m unique words; for a predetermined summary length, identifying a subset of the n sentences, the subset serving as a summary of the electronic document and identifying different aspects/concepts of the original document, the predetermined summary length defining an integer wherein the size of the subset n is less than or equal to the predetermined summary length; wherein identifying the subset includes maximizing the objective function $C_f$;

$$C_f(D[S]) = \sum_{x=0}^{|S|} \sum_{w \in W_x} f(x),$$

$$\text{where } f(x) = \begin{cases} 0 & \text{if } x = 0 \\ \dfrac{1}{2^x - 1} & \text{if } x > 0 \end{cases}$$

or, $$f(x) = \begin{cases} 0 & \text{if } x = 0 \\ 1 & \text{if } x > 0; \end{cases}$$

D is a matrix of n words and m sentences, $W_x$ is a set of unique words/phrases, where every word/phrase in this set $W_x$ appears in exactly x sentences in S, which is a subset of the columns of D with $|S| <= k$ and K is an integer, and wherein $0 \leq x \leq |S|$.

In another embodiment, the disclosure relates to a graphical user interface comprising: an input receiver configured to receive a plain text, a syndication feed or an equivalent artifact, the input receiver further configured to receive configuration information, wherein the configuration information comprises at least one of a summarization algorithm, a summary length, and a spam filter flag; an input transmitter connected to the input receiver, the input transmitter configured to transmit to a linguistic parser the spam filter flag and plain text from the document, the input transmitter configured to transmit to a syndication feed fetcher-parser the syndication feed, and the input transmitter configured to transmit to a calculation module the summarization algorithm and the summary length; an output receiver coupled to the calculation module, the output receiver configured to receive a summary from the calculation module, wherein the summary identifies excerpts from the input text; and an output transmitter connected to the output receiver, wherein the output transmitter is coupled to a first module configured to display the excerpts separately from the text and wherein the output transmitter is coupled to a second module configured to display the excerpts emphasized within the text.

In still another embodiment, the disclosure relates to a system for generating a summary of an electronic document, the system comprising of: a syndication feed fetcher-parser configured to download a plurality of syndication feeds, extract information from each feed, and, for each feed, combine the information into a plain text electronic document; a linguistic parser connected to the syndication feed fetcher-parser, the linguistic parser configured to receive plain text from the syndication feed fetcher-parser and to determine vocabulary of terms within the plain text, wherein the linguistic parser comprises a feature vector module configured to create a feature vector representing sentences based on the vocabulary; and a calculation module connected to the linguistic parser, the calculation module comprising: a receiver to receive the feature vector from the linguistic parser; a collection of selectable algorithms; and a summary computation module connected to the receiver and connected to the collection of selectable algorithms, the summary computation module configured to output a summary of the plain text, the summary identifying sentences to extract from the plain text.

BRIEF DESCRIPTION OF THE DRAWINGS

These and other embodiments of the disclosure will be discussed with reference to the following exemplary and non-limiting illustrations, in which like elements are numbered similarly, and where:

FIG. 3 provides an exemplary pseudocode according to one embodiment of the disclosure;

FIG. 5A shows comparative results of an embodiment of the disclosure versus a first human-generated summary;

FIG. 5B shows comparative results of an embodiment of the disclosure versus a second human-generated summary;

DETAILED DESCRIPTION

Figure 1:
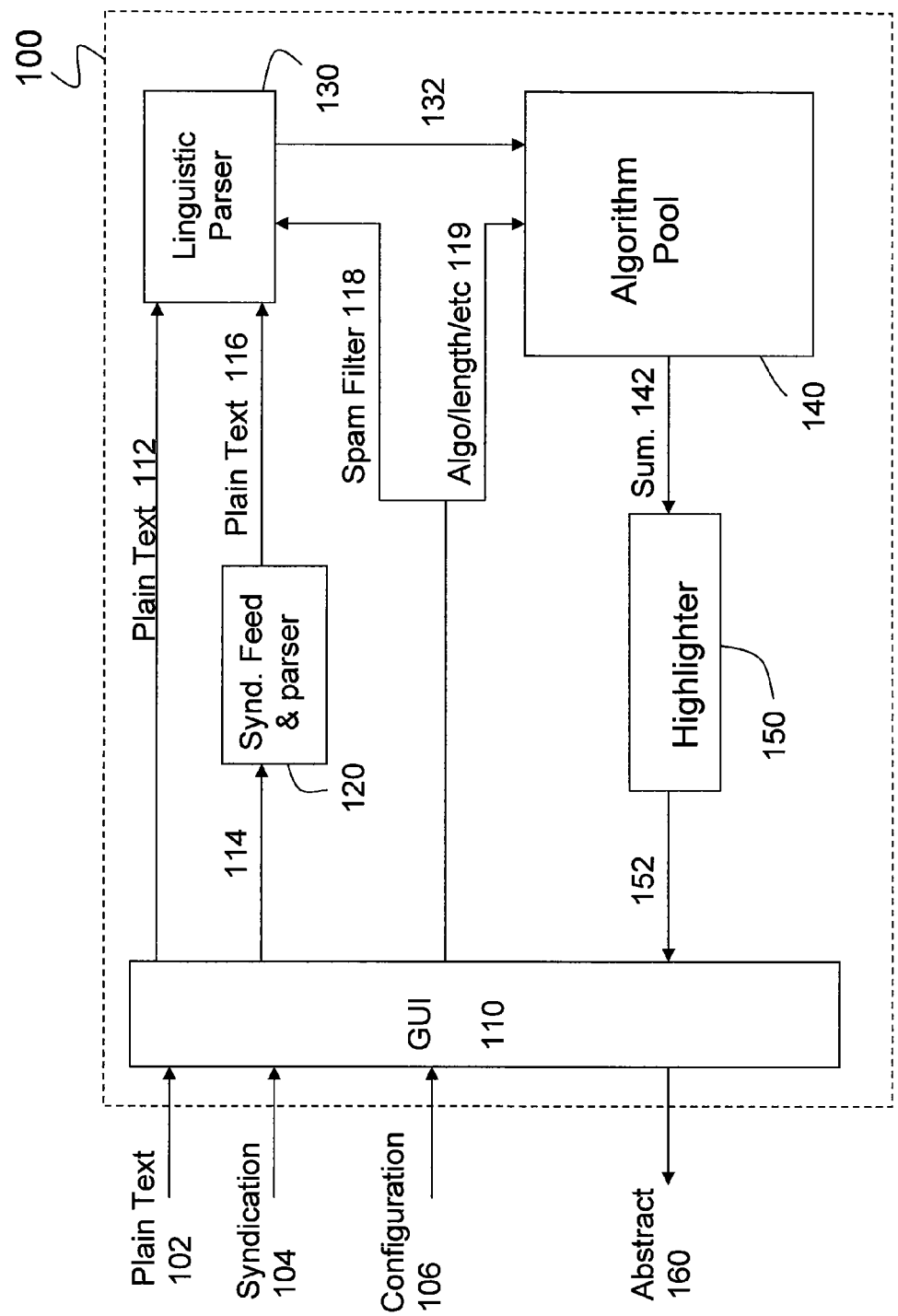
FIG. 1 illustrate a system architecture according to one embodiment of the disclosure.

FIG. 1 illustrates a system architecture according to one embodiment of the disclosure. System 100 of FIG. 1 includes graphic user interface (GUI) 110, syndicate feed and parser 120, linguistic parser 130, algorithm pool 140 and highlighter 152. System 100 can be implemented, for example, at a processor (not shown) in communication with a database (not shown). System 100 can run either as a stand-alone application, as an add-in to a browser or embedded in a text-oriented tool existing browser. System 100 can also be integrated with a web-application as a background process to identify different aspects of online discussions for blogs, products, articles, etc. When running as a stand-alone application, system 100 can summarize documents stored in a local file system. When running as an add-on application, a user can simply select an add-on web button or start the application from a toolbar menu such that syndication feeds would be automatically directed to system 100 for analysis.

System 100 can receive several different types of inputs. For example, a user can provide input 102 as plain text through GUI 110. The plain text input may include one or more text documents. Input 104 is a syndication feed comprising of websites, blogs, etc. that are automatically provided to system 100 through GUI 110. Configuration input 106 can be provided by user or by an auxiliary system (not shown). In one embodiment, configuration input 106 includes summarization parameters such as spam filter criteria, search criteria and number of sentences appearing in the summary. Other configuration criteria may be included without departing from the disclosed principles. Linguistic Parser 130 can comprise conventional parsers adapted to remove stop words (e.g., "and", "the", "or", etc.) and apply stemmer (i.e., find the root verb for the input verbs) applications. Conventional stemmers reduce a verb (noun or adjective) to present tense or its root.

GUI 110 provides 112 plain text input to linguistic parser 130. The plain text may come from input 102 or from syndication feed 104. Depending on its format, syndication feed 104 can be directed 112 to Linguistic Parser 130, or it can be directed 114 to Syndication Feed and Parser ("SFP") 120. Given a URL pointing to a syndication feed, SFP 120 downloads the feed, extracts the title, author, published date, description and other related information and combines them into a plain text document before forwarding 116 the document to Linguistic Parser 130. System 100 can be configured to fetch syndications automatically and regularly.

Linguistic Parser 130 processes the plain text to determine the vocabulary of terms the summarization system uses; it also applies spam filtering techniques to remove spam inputs. In one embodiment, linguistic Parser 130 performs the following operations: sentence segmentation, work tokenization, removal of stop words, token normalization, stemming and spam filtering. Output 132 of Linguistic Parser 130 is a set of informative sentences, each representing a feature vector.

As stated, GUI 110 receives user's instructions as configuration input 106. User's instructions can comprise summarization parameters such as identifying key words, length of the summary document, and an identification of spam words to be filtered from the document. In one embodiment of the invention, the user also selects an algorithm to be used for the document summarization. The algorithm can be selected based on the user's desired application. The spam filter criteria provided by the user is directed 118 to Linguistic Parser 130. The criteria relating to algorithm, selection, length of the summary and degree of orthogonality 119 is directed to algorithm pool 140.

Algorithm Pool 140 can comprise a database of available summarization algorithms. Any of the disclosed inventive algorithms disclosed as well as conventional algorithms can be made available to user. For example, Algorithm Pool 140 can comprise algorithms disclosed below as well as the so-called K-median cluttering algorithm, the Singular Value Decomposition ("SVD") algorithm, and the furthest-neighbor algorithm. A user selects a desired algorithm at GUI 110. The selection can be made to suit the user's particular application. For example, of the user prefers a lengthier and detailed algorithm, she may select the SVG algorithm with a summary that spans more than 250 sentences. GUI 110 may also recommend one or more algorithms after querying the user's intended application. Algorithm pool 140 can comprise one or more processors in communication with one or more databases. Algorithm pool 140 can operate as an independent module for system 100, or it can be integrated into the system.

Figure 2:
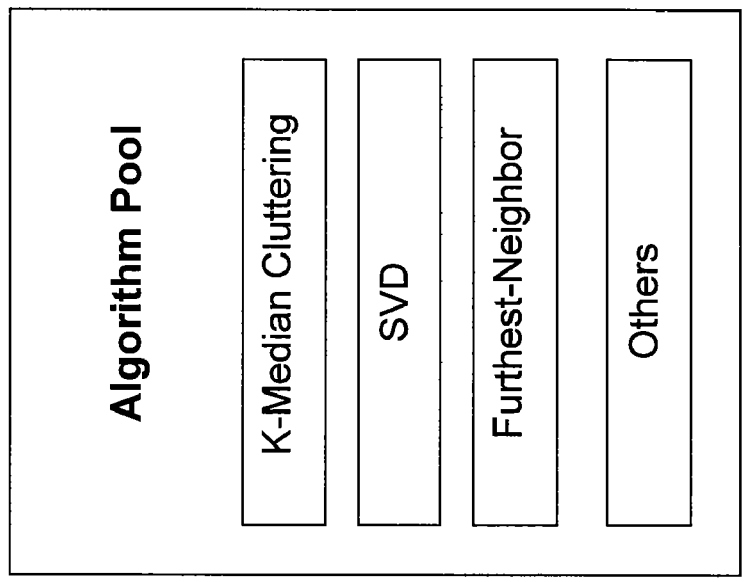
FIG. 2 schematically represents an Algorithm Pool according to one embodiment of the disclosure.

FIG. 2 schematically represents an Algorithm Pool according to one embodiment of the disclosure. Algorithm Pool 200 can comprise one or more processor circuits (not shown) in communication with one or more memory circuits (not shown) which store various summarization algorithm. By way of example, Algorithm Pool 200 of FIG. 2 contains the K-Median Cluttering algorithm, the SVD algorithm and the Furthest-Neighbor algorithm.

Referring again to FIG. 1, having constructed the sentence feature vectors 132, system 100 computes the summary using the algorithm selected by the user in its configuration. The outputs are the indices of the sentences to be extracted. This module can be expanded, allowing new algorithms to be integrated without having to recompile the modules. Algorithm Pool 140 then applies the user's selected algorithm and provides summary 142 to Highlighter 150.

System 100 provides the final results to users in two ways. The system can use Highlighter 150 to mark-up the background of the extracted sentences in the original document with colored areas so that the reader easily locate the highlighted information and identify the context. Alternatively, system 100 can display the extracted sentences (the abstract) in a separate panel for a quick review. Abstract 160 can also be printed.

In one embodiment, summarization comprises constructing summaries by picking sentences that already exist in the input text document. The document summary can consist of at most k sentences derived or extracted from the input document. The number of sentences k is an input parameter and it can capture the user's requirement of small versus large summaries.

Every document can be represented by a matrix D, such that the rows of D correspond to the words and the columns of D correspond to sentences. That is, D(i,j) is the number of appearances of word "i" in sentence "j". Since in one embodiment of the disclosure the stop words and spam words are removed, the entries of D should be expected to take the values of 0 or 1. Therefore, if a document consists of "n" sentences and "m" unique words (after removing stop words and spam words), then matrix D is of size m×n. If "W" denotes the set of unique words, the problem of summarizing document D using at most k sentences can be defined as: given matrix D and integer k, find S, subset of the columns of D with |S|<=k, such that the weighted coverage of the projection of D on S, $C_f(D[S])$ is maximized.

In one embodiment, to calculate the weighted coverage $C_f(D[S])$, let S partition the elements in W (rows of matrix D) into P (W,S)={$W_0$, . . . , $W_{|S|}$}, where every word w ∈ $W_x$ appears in exactly x sentences in S:

$$Cf(D[S]) = \sum_{x=0}^{S} \sum_{w \in W_x} f(x) = \sum_{x=1}^{S} \sum_{w \in W_x} f(x) \quad (1)$$

Weighted coverage $C_f$ can also describe the gain of a summary S.

In one embodiment, function $f(x)$ is determined as a uniform function which allows user more flexibility in defining the summarization parameters. In the case of uniform $f(x)$, it is assumed that $f(0)=0$ and $f(x)=1$, for every x>0. The uniform function implicitly provides higher weight to coverage than orthogonality.

In another embodiment, function $f(x)$ is determined as an exponential function ($f_e$) which provides more orthogonality to the summary. For exponential function $f(0)=0$, and $f(x) = 1/(2^{x-1})$ for every x>0. The exponential function imposes a relatively stronger requirement for orthogonal summaries. The requirement of maximizing $C_f(D[S])$ encourages the selection of sentences that are as orthogonal as possible and at the same time they cover as many words (representatives of different concepts) as possible. Function $f$ controls the strictness of the requirements for coverage and orthogonality.

An application of the disclosed method starts by picking the column (sentence) $s_1$ such that $C_f(D[s_1])$ is maximized. Then, among all remaining columns of D the algorithm proceeds by selecting sentence $s_2$ such that the marginal gain in the weighted coverage by adding sentence $s_2$ to the existing summary is maximized. This process continues until k sentences are picked or if no sentence with a positive marginal gain remains.

As stated, in one embodiment of the disclosure the proposed algorithm takes as input, document D, integer K and function $f$ and outputs a set of S ⊂ D of at most k sentences. An exemplary pseudocode for this algorithm is provided at FIG. 3. The algorithm operates in rounds and picks sentences from the set D. That is, the algorithm starts by picking sentences $S_1$ ∈D such that $G_f(S_1)$ is maximized. Then, among all the sentences in D/$S_1$, it proceeds by picking sentences $s_2$ ∈ {D/$s_1$} such that the marginal gain by adding this sentence to the existing summary is maximized. This process continues until k sentences are picked or if no sentence with a positive marginal gain remains. In one embodiment, the focus can be on the uniform function $f_u$, and the exponential function $f_e$.

In one exemplary implementation, the running time of the algorithm of FIG. 3 was O(kmn); every iteration of the "while" loop (FIG. 3, line 4) required going through the remaining candidate sentences and the actual words these sentences contained. Therefore, every iteration required O(mn). Since the loop is repeated for at most k times, the total running time is O(kmn). For fixed k, this would be linearly related to the size of the input file.

The following experiments were conducted to measure the effectiveness of the disclosed principles against conventional summarization algorithms. Documents were summarized using automated conventional algorithms. Human-generated summaries were also prepared for comparison purposes. Because the experiments were limited to a single document, the running times were efficient and minimal. Accordingly, a discussion of the comparative running times is not provided. Most summaries consisted of about 10 sentences even from the largest document that were about 266 sentences (57 kb).

EXPERIMENT 1

The goal of the experiments was to evaluate summaries produced according to the principles disclosed herein as compared with conventional algorithms including SVD, K-median and Furthest with respect to coverage and orthogonality. Test data from a 2002 Document Understanding Conference ("DUC") was obtained. The dataset will be referred to as the DUC dataset. The DUC data consisted of new articles about different events ranging from natural disasters, everyday pieces of news and biographical information about individuals. At a high level the base documents (interchangeably, documents) of the dataset are organized into document clusters. The dataset consisted of 57 such clusters and every cluster contained 5-15 documents. There were, on average, 10 documents per cluster. Each one of the clusters belonged to one of the following thematic categories: $C_1$-$C_4$.

$C_1$—The documents in a cluster belonging to $C_1$ refer to a single natural disaster event. For example, all the documents within a cluster may refer to a specific hurricane (e.g., hurricane Gilbert). While some of the documents in the cluster belonged to the causes and some other to the effects of the hurricane, all documents referred to the same hurricane $C_2$—The documents in a cluster of category $C_2$ refer to a single event (other than natural disaster event) that appeared in the news. For example, in the dataset there was a cluster with documents referring to some explosion in the Royal Marine School. All the documents in the clusters $C_2$ referred to this specific event.

$C_3$—The documents in a cluster of category $C_3$ refer to different distinct events of a certain type. For example, there was a document cluster whose documents referred to nominations of individuals as ambassadors. All of the documents in this cluster referred to nominations of ambassadors but not necessarily to nominations of the same person.

$C_4$—Finally, all of the documents in a cluster category $C_4$ may present biographical information about a single individual.

All of the documents of a cluster belong in the same category. Namely, the category of the cluster. All four thematic categories are associated with approximately the same number of clusters (and thus approximately the same number of documents). For the majority of experimental trials, and unless otherwise mentioned, the DUC dataset was used as 57 clusters providing 57 distinct documents. All documents of each cluster was concatenated into a single large document which was then provided as the input to the summarization algorithm. Thus, 57 distinct documents were used as input to the summarization algorithms. The DUC dataset presented this way is referred to as the ClusterDUC dataset.

In addition to the documents and the clusters, the DUC dataset also contained two set of human generated summaries for every cluster. Each set of human-generated summary was 200-400 words long. This was approximately equivalent to summaries consisting of 10-20 sentences, respectively. Each such summary was generated by humans that picked subset of the sentences in each cluster to summarize the whole cluster. The human-generated clusters are referred to as Human1 and Human2. The human-generated summaries were compared with the summaries generated by the algorithms.

As stated, the goal of the experiments were to compare the summaries provided by according to the embodiments disclosed herein as compared to the conventional algorithms. Each summary was judged for coverage and orthogonality. ClusterDUC dataset was used for the experiment. For the evaluation the following metric was used to quantify coverage and orthogonality: for a summary S consisting of a number of sentences coverage is quantified as the percentage of words from W that appear in the sentences in S:

$$\text{Coverage}(S) = |U_s \in s^s| \div |W| \quad (2)$$

For any summary S: $0 \leq \text{Coverage}(S) \leq 1$. The closer the coverage value is to 1, the better the coverage of the summary. The orthogonality of a summary S can be evaluated as the average Jaccard distance between the distinct pair of sentences that appear in the summary. The Jaccard distance between two sentences (that is, the set of words from W) s, s' is defined as $$J_D(s, s') = 1 - |s \cap s'|/|s \cup s'| \quad (3)$$

Similarly, orthogonality of the summary S can be evaluated as:

$$\text{Orthogonality}(S) = 2 \div |S|(|S| - 1) \sum_{s,s' \in S s \neq s'} JD(s, s_i) \quad (4)$$

For two sentences s, s', the value of $J_D$ (s, s') takes values between 0 and 1, and so does Orthogonality (S). The closer the value of Orthogonality (S) is to 1, the more orthogonal the summary.

Figure 4A:
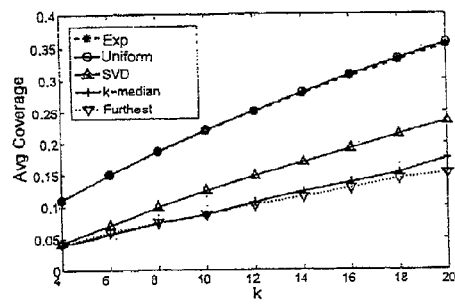
FIG. 4A shows the average coverage of the summaries produced according to the embodiments disclosed herein.
Figure 4B:
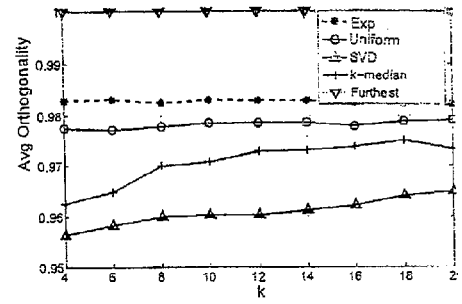
FIG. 4B shows the average orthogonality of the summaries produced according to the algorithms disclosed herein.

The summarization results using DUC dataset is reported in FIGS. 4A and 4B. Specifically, FIG. 4A shows the average coverage of the summaries produced according to the embodiments disclosed herein. As shown, the summaries were obtained according the disclosed principles using the uniform function and the exponential function. Conventional algorithms SVD, K-median and Furthest were also used for k={4, 6, 8 . . . 20}. The average was taken over 57 different documents in the ClusterDUC dataset that were used as input to the summarization algorithms. As shown in FIG. 4A, the average coverage using the exponential function or the uniform function according to the disclosed embodiments produced summaries with noticeably larger coverage than the conventional algorithms. In fact, referring to FIG. 4A, the conventional algorithms produced summaries that are approximately equivalent with respect to coverage, and the coverage was approximately twice the coverage achieved by the second best algorithm, which was SVD. Finally, K-median and Furthest produced significantly lower coverage results than the other methods.

FIG. 4B shows the average orthogonality of the summaries produced according to the algorithms disclosed herein. Here, it can be noticed that all five algorithms produce summaries with high orthogonality values. Using the disclosed exponential function produced higher average orthogonality than that of the uniform function for all values of k. The result was expected given that the $f_{exp}$ function used penalizes non-orthogonal solutions. In FIG. 4B, it can be seen that the Furthest algorithm produced summaries with orthogonality values equal to 1 for all values of k. Although this can be seen as an advantageous feature of the Furthest algorithm, when we look at the combination of coverage and orthogonality of the summaries, it can be seen that despite high orthogonality value, the algorithm provides low coverage. This implies that Furthest selects sentences with a small number of words and thus does not necessarily provide good summaries.

EXPERIMENT 2

The goal of this experiment was to compare the automatically-generated summaries produced by the Exp. function, Uniform function, SVD, k-median and Furthest to the pre-existing human-generated summaries Human1 and Human2. For this experiment the ClusteredDUC dataset was used. The results of the experiment demonstrate that the Exp function and the Uniform function produced results that are very close to the human-generated summaries.

The Evaluation metric was as follows: human-generated summary H was compared with a computer-generated summary S by taking the average closeness of every sentence h ∈ H to its closest sentence in the computer-generated summary. Closeness between two sentences is evaluated by the size of their intersection. The larger the intersection between two sentences, the closer these two sentences. In other words, the higher the value of closeness the more similar the two summaries H and S are. This is shown at Equation 5, as follows:

$$\text{Closeness}(H, S) = \frac{1}{|H|} \sum_{h \in G} \max_{s \in S} |s \cap h|. \quad (5)$$

FIG. 5A shows comparative results of an embodiment of the disclosure versus a first human-generated summary. More specifically, FIG. 5A shows the average closeness of the computer-generated summaries to the human summaries Human1. Similarly, FIG. 5B shows comparative results of an embodiment of the disclosure versus a second human-generated summary. More specifically, FIG. 5B shows the average closeness between the human-generated summaries Human2 and the computer-generated summaries. Values of k=10 and 20 were used since these are the values of k for which human-generated summaries were produced. The highest closeness value was observed between Human1 with itself (FIG. 5A) and Human2 with itself (FIG. 5B). Among the computer-generated summaries the following trend was observed: the summaries produced by the Exp. function, Greedy function and SVD are the closest to the human-generated summaries for both Human1 and Human2. On the other hand, the summaries produced by k-median and Furthest were relatively more distant from the human-generated summaries. Also the closeness between the two human-generated summaries is not significantly larger than the closeness between computer-generated and human-generated summaries. The latter observation illustrates the overall difficulty of document summarization and points out the subjectiveness of the task.

EXPERIMENT 3

Experiment 3 reports the results of a user study in which human subjects were asked to evaluate the human-generated and the computer-generated summaries and rank the results according to certain criteria. The experiment were performed for ten different clusters; that is, 10 documents from the ClusteredDUC dataset. The 10 documents were chosen randomly among the 57 documents available. Each document was evaluated by at least 5 and up to 8 evaluators. There were 21 human evaluators that judged the summaries. Therefore, each algorithm was evaluated from 50 up to 80 times.

For each evaluation, the evaluators were provided with a document from the ClusteredDUC dataset, and with six different summaries. Four of the summaries were produced by algorithms the Exp function, SVD, K-median and Furthest, while the other two were the summaries from Human1 and Human2. For all the summaries k=10, since for this value of k the actual human-generated summaries were available. For each document all the summaries were labeled with pseudo-random identifiers (different identifiers were used for different documents) and, therefore, the evaluators could not know whether a summary was generated by a human or a computer. Finally, the evaluation the Uniform function algorithm was omitted from the evaluation because its summaries were very similar to the summaries of the Exp function.

The human evaluators were asked to rank the summaries (with 1 being the best summary and 6 being the worst). No two summaries could get the same rank. The ranking criteria included coverage and orthogonality (summaries that were satisfying those should get a better position in the ranking). The evaluators were also asked not to judge the summaries based on the positions of the summary sentences in the original document, the frequency of the words that appear in the summary sentences or the cohesiveness of the summary.

The results obtained in the user study were summarized by calculating the average rank of each summary in the rankings of the human judges. The average was taken across all different documents and different evaluations per document. The smaller the value of the average rank the better the corresponding summarization algorithm.

Figure 6:
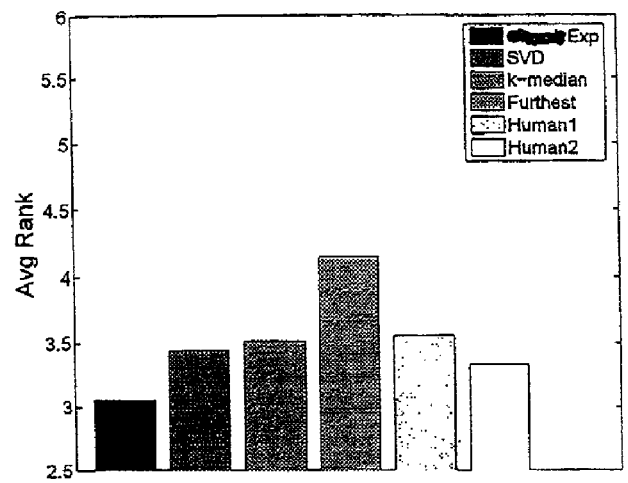
FIG. 6 shows the average rank position of the summaries produced and evaluated in Experiment 3.

FIG. 6 shows the average rank position of the summaries produced and evaluated in Experiment 3 It can be seen that the summaries produced by the Exp. function received the best (lowest) average rankings. Almost equivalent are the rankings obtained by Human1. The human summaries produced by Human2 as well as the other algorithms receive worse rankings (higher average rank positions), with the worst algorithm being the Furthest.

Figure 7:
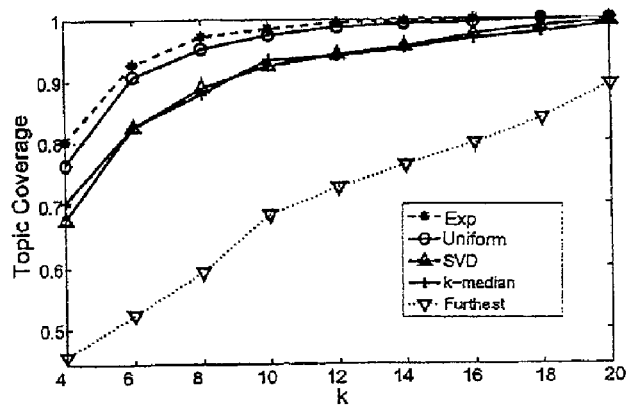
FIG. 7 shows the topic coverage results of Experiment 4.

FIG. 7 shows the topic coverage of Experiment 3.

EXPERIMENT 4

In Experiment 4, the goal was to further investigate the effectiveness of the different algorithms in creating summaries that cover different aspects of the input documents. The main result of this experiment is that the algorithms disclosed herein (i.e., the Exp. function and the Uniform function) successfully cover all possible aspects of a document, even when restricted to construct summaries with small number of sentences. For this experiment the base documents of the DUC datasets were used to compose synthetic documents which were then summarized. Every synthetic document is a concatenation of four base documents from the original DUC dataset; the i-th base document that participates in the synthesis (with i={1, 2, 3, 4}) was selected uniformly at random amongst the base documents of the i-th category. Thus, every one of the four categories was represented in every synthetic document. One hundred such synthetic documents were generated by repeating the above process 100 times. The generated dataset was identified as the MixedDUC dataset. The size of the synthetic documents in the MixedDUC dataset was between 15 Kb and 60 Kb, and each such document had approximately 120-500 sentences.

A document D was considered that was a concatenation of x documents D={$d_1|d_2|\ldots|d_x$} and it was assumed, without loss of generality, that d was a base document from category $C_i$. Le S be a summary of D. It can be said that S covers topic $C_i$ if there exists a sentence in s ∈ S such that s ∈ $d_i$. The topical coverage of summary S with respect to document D can be defined as Equation (6):

$$Tc(S \mid D) = \frac{1}{x} |\{C_i \mid \exists s \in S : s \in d_i\}|. \quad (6)$$

The higher the value of the topic coverage of a summary the better the summary is in capturing the different aspects of the input document. In this experiment four categories were considered. Thus, x=4, and every input document D was a concatenation of the 4 documents, with each belonging in a different category.

FIG. 7 shows the topic coverage results of Experiment 4. Specifically, FIG. 7 shows the average topic coverage of the summaries obtained by the Exp. function, the Uniform function, SVD, K-median and Furthest algorithms for values of k ∈ {4, . . . ,20}. The average was taken over all the 100 documents of the MixedDUC dataset.

FIG. 7 shows that the summaries produced by the Exp function and the Uniform function algorithms exhibit almost identical topic coverage, which was also higher than the topic coverage exhibited by the summaries of the other three algorithms. The second best pair of algorithms for topic coverage (TC) measure are the SVD and K-median. The Furthest algorithm produces significantly low topic-coverage summaries. It is noted that the Exp. function and the Uniform function algorithms can cover almost all 4 categories with summaries consisting just of 6 sentences.

While the principles of the disclosure have been illustrated in relation to the exemplary embodiments shown herein, the principles of the disclosure are not limited thereto and include any modification, variation or permutation thereof.

What is claimed is:

1. A computer-implemented method for creating a summary of one or more electronic documents, the summary consisting of sentences that span a portion of a spectrum of aspects discussed in the one or more electronic documents and capturing a different aspect of the document, the method comprising:
   at a processor circuit in communication with a database, combining information extracted from said one or more electronic documents into a single plain text electronic document;
   filtering the plain text electronic document to remove stop words and spam words and linking semantically similar words and phrases, to construct a filtered electronic document D having n sentences and m unique words;
   identifying a subset of the n sentences for a predetermined summary length, the subset summarizing filtered electronic document D and identifying different aspects of the document D,
   wherein the summary length is an integer and wherein the size of the subset is less than or equal to the predetermined summary length;
   optimizing a combinatorial function defined $C_f$ in which $W_x$, is a set of unique words/phrases, where every word in this set $W_x$, appears in exactly x sentences in S; and D is a matrix, k is an integer, S is a subset of the columns of D with $|S|<=k$ such that the following function is maximized $$C_f(D[S]) = \sum_{x=0}^{|S|} \sum_{w \in W_x} f(x),$$

wherein $f$ is a function defined as $$f(x) = \begin{cases} 0 & \text{if } x = 0 \\ \frac{1}{2^x - 1} & \text{if } x > 0 \end{cases}$$

or $$f(x) = \begin{cases} 0 & \text{if } x = 0 \\ 1 & \text{if } x > 0; \end{cases}$$

and wherein $0 \leq x \leq |S|$.

* * * * *